US012657110B2

(12) United States Patent
Cable et al.

(10) Patent No.:  US 12,657,110 B2
(45) Date of Patent:     Jun. 16, 2026

(54) COMPUTER-AUTOMATED ANALYSIS AND VALIDATION SYSTEMS FOR COMPUTER-READABLE CODE FILES

(71) Applicant: Express Scripts Strategic Development, Inc., St. Louis, MO (US)

(72) Inventors: Steven Cable, Grand Junction, CO (US); Beverly K. De Loach, Carrizo Springs, TX (US); Erol Kucukarslan, Morris Plains, NJ (US); Beverly Leach, Stamford, CT (US); Alan Gandarilla, San Francisco, CA (US); Long V. Nguyen, Denver, CO (US); Tracy L. Hautanen-Kriel, St. Johns, FL (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 188 days.

(21) Appl. No.: 18/484,500

(22) Filed: Oct. 11, 2023

(65) Prior Publication Data

US 2025/0123947 A1     Apr. 17, 2025

(51) Int. Cl.

| | |
|---|---|
| *G06F 8/77* | (2018.01) |
| *G06F 8/40* | (2018.01) |
| *G06F 8/61* | (2018.01) |
| *G06F 8/75* | (2018.01) |
| *G06F 11/36* | (2025.01) |
| *G06F 11/3604* | (2025.01) |
| *G06F 8/10* | (2018.01) |
| *G06F 8/41* | (2018.01) |

(Continued)

(52) U.S. Cl.
CPC ............ *G06F 11/3612* (2013.01); *G06F 8/10* (2013.01); *G06F 8/40* (2013.01); *G06F 8/43* (2013.01); *G06F 8/64* (2013.01); *G06F 8/65* (2013.01); *G06F 8/75* (2013.01); *G06F 8/77* (2013.01); *G06F 11/3616* (2013.01); *G06F 21/577* (2013.01)

(58) Field of Classification Search
CPC ............ G06F 11/3612; G06F 11/3664; G06F 11/3616; G06F 8/65; G06F 8/77; G06F 8/75; G06F 8/64; G06F 8/40; G06F 8/10; G06F 8/43; G06F 21/577
See application file for complete search history.

(56) References Cited

U.S. PATENT DOCUMENTS

| | | | |
|---|---|---|---|
| 7,398,237 B2* | 7/2008 | Agostini | ................ G06Q 40/00 705/37 |
| 7,603,358 B1* | 10/2009 | Anderson | ............... G06F 16/40 |
| 8,700,602 B2 | 4/2014 | Schapker | |

(Continued)

*Primary Examiner* — Anibal Riveracruz
(74) *Attorney, Agent, or Firm* — Miller Johnson

(57) ABSTRACT

A system includes processor hardware and memory hardware storing instructions. The instructions include, in response to receiving an input indicating a code file from a user device of a user, obtaining the code file, identifying a code language of the code file and a plurality of objects within the code file, and obtaining a set of rules. The instructions include, for each rule, applying the rule to each object to determine an adherence of the object to the rule or a violation of the object of the rule. The instructions include generating a report that indicates, for each rule and for each object, the adherence of the object to the rule or the violation of the object of the rule. The instructions include transmitting, for display on the user device, the generated report.

20 Claims, 11 Drawing Sheets

(51) Int. Cl.
  *G06F 8/65* (2018.01)
  *G06F 21/57* (2013.01)

(56) References Cited

U.S. PATENT DOCUMENTS

| | | | | |
|---|---|---|---|---|
| 9,154,521 | B2 | 10/2015 | Warn | |
| 9,378,115 | B2 | 6/2016 | Schmitt | |
| 9,547,702 | B2 | 1/2017 | Vilakkumadathil | |
| 9,836,487 | B2 * | 12/2017 | Ghosh | G06F 16/21 |
| 9,892,207 | B2 | 2/2018 | Schmidt | |
| 9,910,953 | B2 | 3/2018 | Adel | |
| 9,990,183 | B2 | 6/2018 | Chandra | |
| 11,914,993 | B1 * | 2/2024 | Garg | G06F 8/77 |
| 2005/0268258 | A1 | 12/2005 | Decker | |
| 2008/0229290 | A1 * | 9/2008 | Jones | G06F 8/70 |
| | | | | 717/137 |
| 2008/0262987 | A1 | 10/2008 | Meadows | |
| 2009/0171903 | A1 | 7/2009 | Lin | |
| 2011/0078211 | A1 | 3/2011 | Gass | |
| 2012/0198365 | A1 | 8/2012 | Bornheimer | |
| 2012/0239680 | A1 | 9/2012 | Gudla | |
| 2013/0031044 | A1 * | 1/2013 | Miranda | G06N 20/00 |
| | | | | 706/47 |
| 2014/0040871 | A1 | 2/2014 | Schwan | |
| 2019/0243629 | A1 * | 8/2019 | Gass | G06F 8/40 |
| 2019/0258565 | A1 * | 8/2019 | Ranjan | G06F 8/60 |
| 2024/0012909 | A1 | 1/2024 | Young | |

* cited by examiner

Pallet Sizing And Pucking Device(s) — 206

Loading Device(s) — 208

Inspect Device(s) — 210

Unit of Use Device(s) — 212

Automated Dispensing Device(s) — 214

Manual Fulfillment Device(s) — 216

Review Devices — 218

Imaging Device(s) — 220

Cap Device(s) — 222

Accumulation Devices — 224

Packing Device(s) — 226

Literature Device(s) — 228

Unit of Use Packing Device(s) — 230

Mail Manifest Device(s) — 232

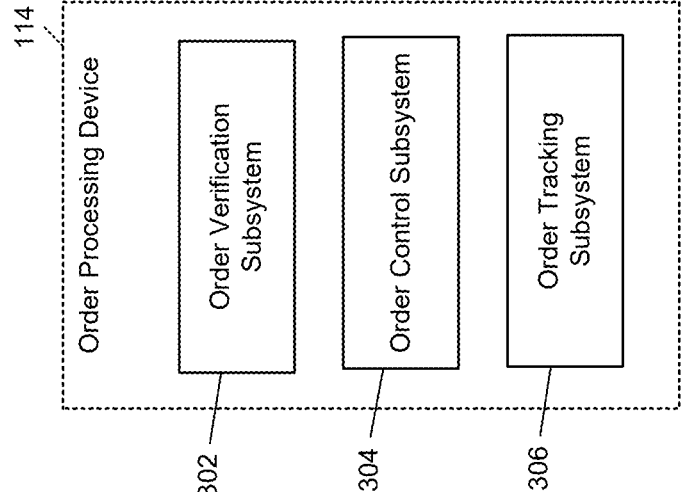
FIG. 3

700

```
Report
    INFO    VERBOSE      = True
    INFO    PROJECT NAME = CCW-D/testing
    INFO    Rules Eng Typ= TERADATA_DDL
    INFO    PARALLEL_DEG = 1
    INFO              Note: The grammar file for TD16 is already compiled.
    INFO    XML_FILENAME = $WORKSPACE/teradata/liquibase.xml
    INFO              Good, the XML file appears valid
    INFO              Found 1 file to process...
    INFO              Checking the xml file for duplicate filenames...
    INFO              Read   163 available rules.
    INFO              Read    68 rules.
    INFO              Read    66 documentation URLs.
    INFO              Read   113 ruleset severities.
    INFO              Read     1 expected items.
    INFO              Read   263 rules exceptions from the DMV database.
    INFO              Read     5 array exceptions from the DMV database.
    INFO              Read     9 articles from the DMV database.
    INFO              Read    14 business terms from the DMV database.
    INFO              Read    31 classwords from the DMV database.
    INFO              Read    15 classword exceptions from the DMV database.
    INFO              Read   185 classword datatype variations from the DMV database.
    INFO              Read    57 classword-datatype lists from the DMV database.
    INFO              Read   675 techdebt exclusions from the DMV database.
    INFO              Read   108 Known Databases from the DMV database.
    INFO              Read    48 multiset base tables from the DMV database.
    INFO              Read 5,955 Standard Enterprise names from the DMV database.
    INFO              Read   708 Uncleared Techdebt records from the cached file.
    INFO    Getting all SQL statements...
    ================================================================
    INFO              The following statements were found:
    INFO              ----------------------------------------------------------------
    INFO        Line  Stmt Number  : 1
    INFO          1   CREATE MULTISET TABLE CCW_BASE_DEV.CHECK_R415_1
    INFO              ----------------------------------------------------------------
    INFO        Line  Stmt Number  : 2
    INFO          1   COMMENT ON TABLE CCW_BASE_DEV.CHECK_R415_1 IS 'Test
    table';
    ================================================================
    INFO    Checking all rules...
    INFO    Checking rule g001...
    DEBUG             Good      : No UTF-8 errors found in 1 file.
    INFO    Checking rule g003...
    DEBUG             Good      : No syntax errors found in 1 file.
    INFO    Checking rule g004...
    DEBUG             Good      : CCW_BASE is the database context for table
    CHECK_R415_1
    DEBUG             Good      : A database context is found for all tables, views, and
    comments.
```

```
Report
        INFO     Checking rule g005...
        DEBUG            Good      : All command types are known.
        INFO     Checking rule g011...
        DEBUG            Good      : All tables are using a consistent naming method.
        INFO     Checking rule r203...
        DEBUG            Good      : No column comments are too long.
        INFO     Checking rule r205...
        DEBUG            Good      : CCW_BASE.CHECK_R415_1 has no column names with bad
        characters.
        DEBUG            Good      : No tables have any column names with bad characters.
        INFO     Checking rule r207...
        DEBUG            Good      : No column comments have bad characters.
        INFO     Checking rule r415...
        ERROR            *********************************************************
        ERROR            ERROR-r415  : BASE table CCW_BASE.CHECK_R415_1 should not be
        MULTISET.
        ERROR            *********************************************************
        INFO             See also   : http://i.cig.na/0IBEZ
        INFO             Filename   : teradata/sql/check_r415.1.sql
        INFO             CREATE MULTISET TABLE CCW_BASE_DEV.CHECK_R415_1
        INFO
        INFO             Notice     : Found 1 BASE table that should not be Multiset.
        INFO     Checking rule r421...
        INFO     Checking rule r429...
        DEBUG            Good      : All columns in CHECK_R415_1 with classword IND are using an
        appropriate datatype.
        DEBUG            Good      : All tables with a IND column name are using an appropriate
        datatype for it.
        INFO     Checking rule r443...
        DEBUG            Good      : All columns in CHECK_R415_1 with classword RTO are using an
        appropriate datatype.
        DEBUG            Good      : All tables with a RTO column name are using an appropriate
        datatype for it.
        INFO     Checking rule r457...
        DEBUG            Good      : Found no tables that are Fallback.
        =================================================================
        INFO             Notice:  One or more errors were found.
        INFO             For a summary of all errors, see:
        INFO             $TEMP_DIR/Rules_Engine.errors
        INFO     For convenience, the contents of that file are:
        INFO     Filenum, name: 1, sql/check_r415.1.sql
        INFO     ERROR-r415  : BASE table CCW_BASE.CHECK_R415_1 should not be MULTISET.
        =================================================================
        INFO     Num Files Processed = 1
        INFO     Num Stmts Processed = 2 of 2
        INFO     Techdebt used: 0 times
        INFO     Memory  used: 59.1 Mb
        INFO     Time    used: 2 seconds
```

FIG. 7B

COMPUTER-AUTOMATED ANALYSIS AND VALIDATION SYSTEMS FOR COMPUTER-READABLE CODE FILES

FIELD

The present disclosure relates to analysis and validation of computer code and more particularly to computer-automated analysis and validation of code files.

SUMMARY

A system includes processor hardware and memory hardware coupled to the processor hardware. The memory hardware stores a database code repository including a plurality of code files, a rules database including a plurality of rules, and instructions for execution by the processor hardware. The instructions include, in response to receiving an input indicating a code file from a user device of a user, obtaining the code file from the database code repository. The instructions include identifying a code language of the code file. The instructions include identifying a plurality of objects within the code file. The instructions include obtaining a set of rules from the rules database, for each rule of the set of rules, applying the rule to each object of the plurality of objects to determine an adherence of the object to the rule or a violation of the object of the rule. The instructions include generating a report that indicates, for each rule of the set of rules and for each object of the plurality of objects, the adherence of the object to the rule or the violation of the object of the rule. The instructions include transmitting, for display on the user device, the generated report.

In other features, the code file includes code in a structured format. In other features, the code file includes at least one of structured query language (SQL) code and data definition language (DDL) code. In other features, the code file is associated with at least one of event stream processing (ESP) and data model extracts.

In other features, identifying the plurality of objects within the code file includes obtaining a grammar file from a grammar file database, the grammar file is associated with the identified code language of the code file, and processing the grammar file in conjunction with the code file to identify the plurality of objects. In other features, the memory hardware stores identification of a set of rules to skip and a set of rule exceptions for the code file.

In other features, the memory hardware stores a report database and the instructions include storing the generated report in the report database. In other features, the instructions include, in response to receiving a report request from the user device, obtaining a first report indicated in the report request from the report database and transmitting, for display on the user device, the first report.

In other features, the rules database stores, for each rule of the set of rules, an indication that violation of the rule generates at least one of a warning and an error. In other features, the instructions include, in response to receiving a rule add request, adding a rule specified by the rule add request to the rules database and, in response to receiving a rule delete request, removing a rule specified by the rule delete request from the database.

A computer-implemented method includes, in response to receiving an input indicating a code file from a user device of a user, obtaining the code file from a database code repository. In other features, the computer-implemented method includes identifying a code language of the code file. In other features, the computer-implemented method includes identifying a plurality of objects within the code file. In other features, the computer-implemented method includes obtaining a set of rules from a rules database. In other features, the computer-implemented method includes, for each rule of the set of rules, applying the rule to each object of the plurality of objects to determine an adherence of the object to the rule or a violation of the object of the rule. In other features, the computer-implemented method includes generating a report that indicates, for each rule of the set of rules and for each object of the plurality of objects, the adherence of the object to the rule or the violation of the object of the rule. In other features, the computer-implemented method includes transmitting, for display on the user device, the generated report.

In other features, the code file includes code in a structured format. In other features, the code file includes at least one of structured query language (SQL) code and data definition language (DDL) code. In other features, the code file is associated with at least one of event stream processing (ESP) and data model extracts.

In other features, identifying the plurality of objects within the code file includes obtaining a grammar file from a grammar file database, the grammar file is associated with the identified code language of the code file, and processing the grammar file in conjunction with the code file to identify the plurality of objects. In other features, the computer-implemented method includes identifying at least one of a subset of the set of rules to skip and a set of rule exceptions for the code file.

In other features, the computer-implemented method includes storing the generated report in a report database. In other features, the computer-implemented method includes, in response to receiving a report request from the user device, obtaining a first report indicated in the report request from the report database, and transmitting, for display on the user device, the first report.

In other features, the rules database stores, for each rule of the set of rules, an indication that violation of the rule generates at least one of a warning and an error. In other features, in response to receiving a rule add request, adding a rule specified by the rule add request to the rules database. In other features, in response to receiving a rule delete request, removing a rule specified by the rule delete request from the database.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3 is a functional block diagram of an example order processing device, which may be deployed within the system of FIG. 1.

FIGS. 7A-7B are an example report generated by the code file analyzing system according to principles of the present disclosure.

In the drawings, reference numbers may be reused to identify similar and/or identical elements.

DETAILED DESCRIPTION

High-Volume Pharmacy

Figure 1:
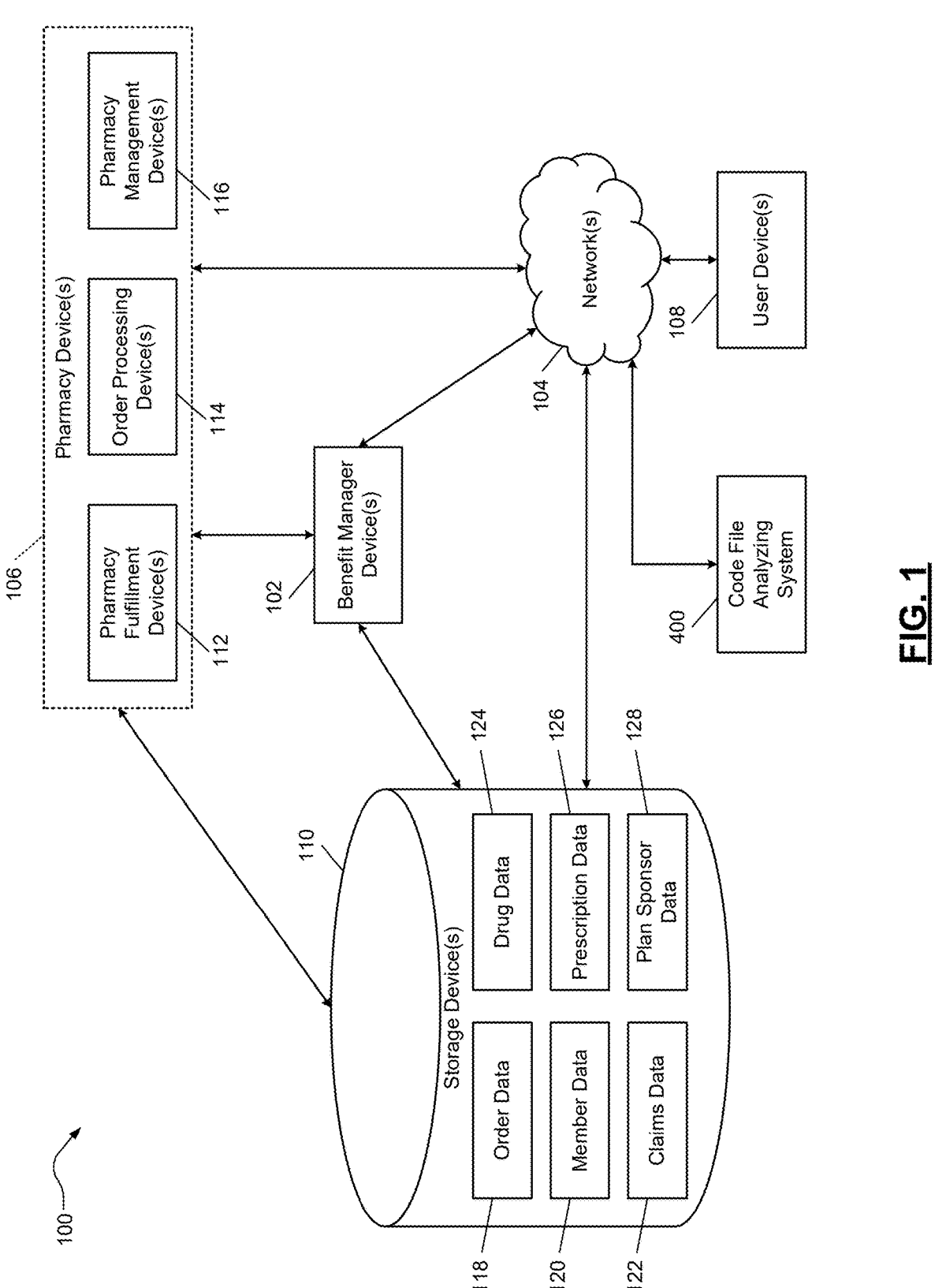
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
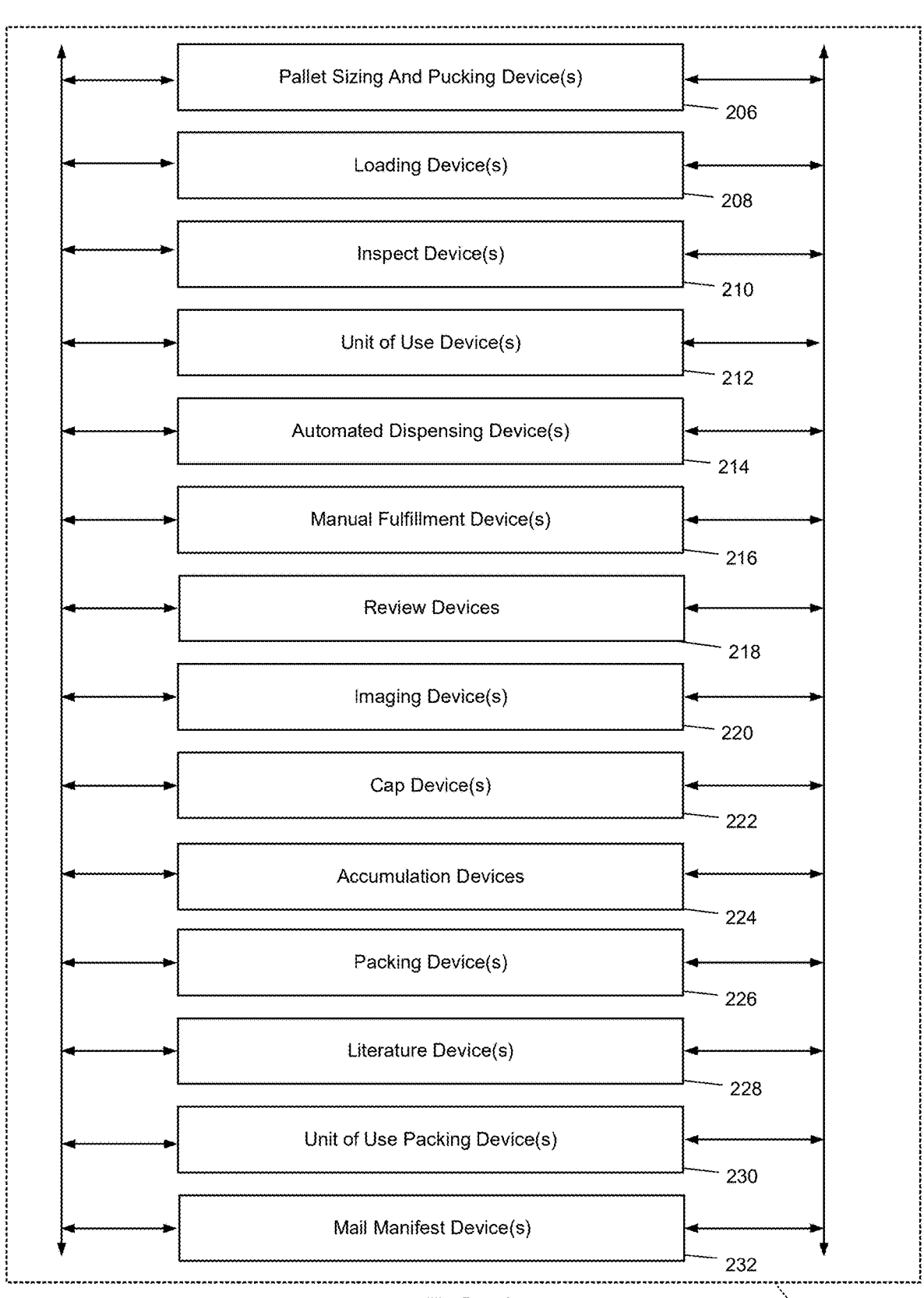
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Code File Analyzing System

A code file analyzing system generates reports to validate code files by identifying errors and inconsistencies within a code file. A code file may include structured query language (SQL) code. The code file analyzing system may be used by a manager or a code developer who is creating one or more code files to validate the code files. In various implementations, the code file analyzing system displays a report, including the identification of any error included in the code files, and stores the report in a report database for future review and assessment. While the code file analyzing system is described with respect to analyzing SQL code, the same system can be used to analyze other types of code. Since the code file analyzing system analyzes a code file based on a set of rules, the set of rules can be updated or adjusted based on the code file or code being analyzed.

The rules may include rules for table definitions, column definitions, and existence of data lineage information or definitions. The rules may be based on physical or logical rules and are categorized accordingly. Logical rules are related to those rules that ensure an object of a code file is properly defined and the relationships between the object and other objects within the code file are defined. Physical rules may be related to specific implementations of the code file, such as limiting the physical length of a definition. The rules may further be based on industry standards or specific entity-based rules that an entity associated with the code file analyzing system adheres to, such as preferred names. For example, table definitions are used to understand what the data is and how to use the data associated with the code file correctly, so one rule is that is a comment must be defined for each table that is defined.

The code file analyzing system generates a variety of pass, warn, or error indicators for each of the rules run against the code files. In the generated report, the user running the code file analyzing system can see which rules were followed, resulting in a pass, and those rules that were not followed, resulting in a warning or an error. Certain rules result in a warning or an error based on how egregious it is to break the particular rule. For example, a warning means that a rule was not followed, for example, a rule related to industry best practices; however, the code file will still meet the minimum requirement, but the code file can be better.

In various implementations, an error may result in the code file not operating correctly, for example, a table not defined. Otherwise, the code file may operate including an error; however, the error should be fixed. Since rules are adhered to or violated, the rules are categorized or include an indicator regarding whether violating the rule results in a warning or an error.

A manager or code developer may use the code file analyzing system in order to review the code developer's work or to see how to improve the code file, if needed. In various implementations, the report may provide feedback regarding how to fix a particular warning or error. For example, if a rule related to using a new business term instead of an old business term is violated, the report may include the new business term, allowing a code developer to easily fix the problem.

The code file analyzing system is an automated way to validate code files, or portions of code files, against code file policy, code file general rules, and best practices. The code file analyzing system provides a code developer with an opportunity to assess a development code file before passing it off for review and implementation. The code file analyzing system can also be used by managers for objectives and key results as well as key performance indicators.

Returning to FIG. 1, the system 100 may include a code file analyzing system 400 configured to generate reports to validate code files by identifying errors and inconsistencies within the code files. In various implementations, a code file may include various forms of code and/or code languages. For example, a code file may include structured query language (SQL) code and/or data definition language (DDL) code, among others. A code file may include code written in Teradata, Hive, Oracle, Database 2 (Db2), Postgres, Redshift, Databricks, and/or Snowflake, among others. In some examples, the code of the code file may be associated with managing and/or manipulating structured data in a database management system (for example, data of storage device(s) 110). The code may be used to perform various operations such as querying, updating, inserting, and/or deleting data in one or more databases. In some examples, a code file may be associated with code having alternative structured formats. For example, a code file may be associated with an event stream processing (ESP) job schedule and/or Erwin data model extracts, among others.

High-Level Diagram

Figure 4:
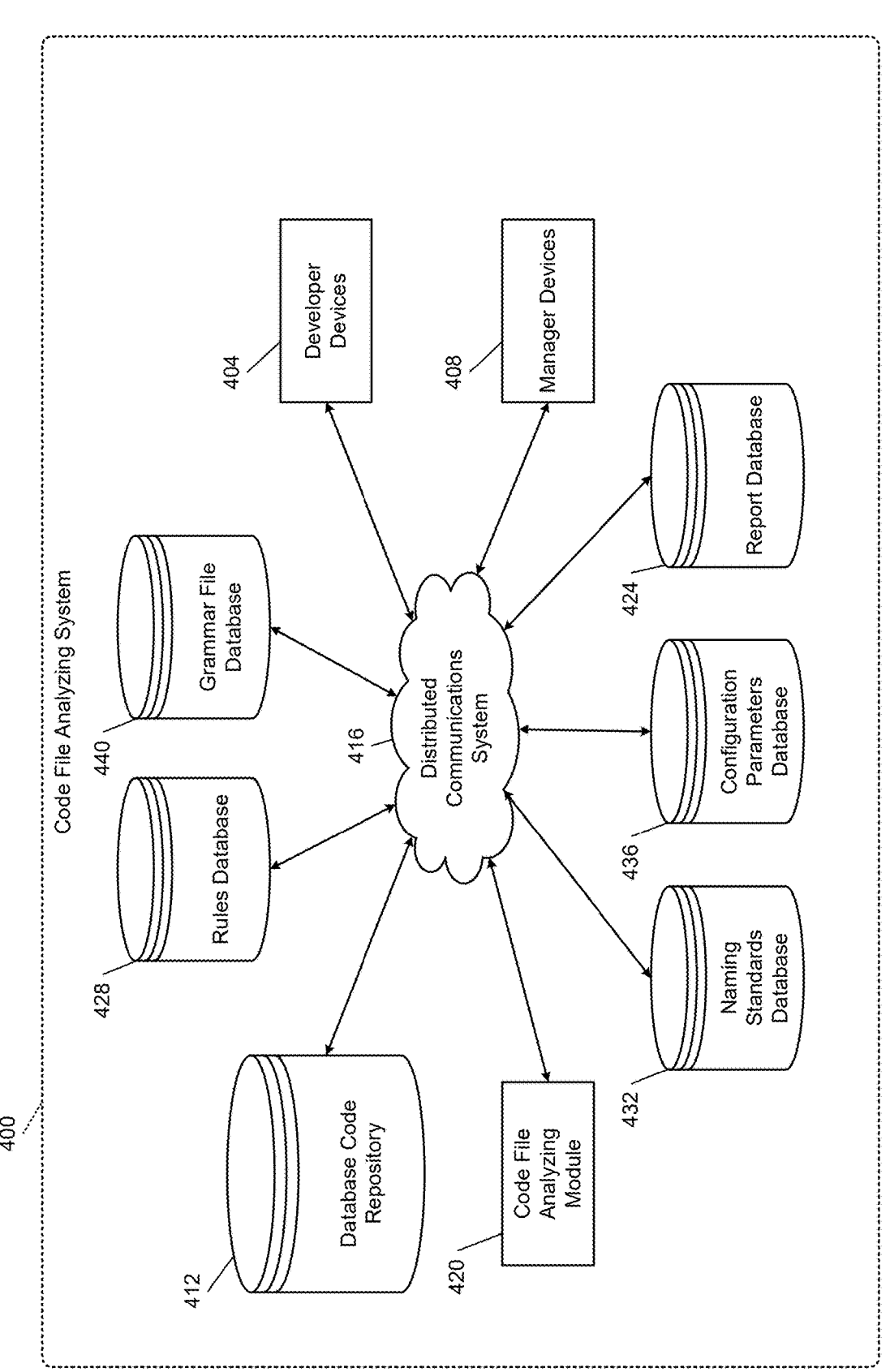
FIG. 4 is a high-level block diagram of an example code file analyzing system according to principles of the present disclosure.

FIG. 4 is a high-level block diagram of an example implementation of the code file analyzing system 400 according to principles of the present disclosure. In various implementations, the code file analyzing system 400 may read the database code (for example, database definition language (DDL)) from the database code repository 412, various operational inputs, such as runtime parameters (for example, the location where to find the database code), configuration parameters, the list of rules to check, naming standards, and grammar syntax specifications. The code file analyzing system 400 may check all the rules for all the objects (for example, tables, columns, views, storage parameters, etc.) and posts the results to one or more manager devices 408, one or more developer devices 404, and/or the report database 424.

In various implementations, the code file analyzing system 400 receives input from developer devices 404 and manager devices 408 (generally, user devices). The developer devices 404 can upload code files to a database code repository 412 (for example, code file database) via a distributed communication system 416. The developer devices 404 and the manager devices 408 can also request a code file analyzing module 420 to generate a report of a particular code file or a particular set of code files stored in the database code repository 412. The generated reports are stored in a report database 424.

In various implementations, the rules are stored in a rules database 428. A naming standards database 432 may store entity defined naming standards associated with structured data of one or more databases. For example, the naming standards may include entity approved abbreviations and class words, indefinite articles and conjunctions, and/or obsolete business terms, among others.

In various implementations, a configuration parameters database 436 may store approved exceptions or variations to certain rules and/or standards rules (for example, entity defined rules and/or standards), business use case (BUC) codes associated with code files including ESP job schedules, filenames that have uncleared technical debt, class structure data associated with the various languages of the code files, and/or identification of rules that should be skipped, among others. For example and without limitation, an exception may include table and/or column names that are approved to vary from the entity naming standards.

In various implementations, a grammar file database 440 may store a plurality of grammar files. The grammar file database 440 may store one more grammar files associated with each of the code languages of the code files. In some examples, a grammar file defines the syntax and structured grammar of a code language. A grammar file may describe the rules and/or patterns that make up a particular code language. The code file analyzing system 400 may use the grammar files to parse, analyze, and/or process the code files. In some examples, a grammar file may be created by a code developer and/or a manager, among others.

In various implementations, the code file analyzing module 420 has access to a plurality of databases associated with the system 100 (for example, storage device(s) 110). The developer devices 404 and the manager devices 408 are generally computing or mobile computing devices, such as a phone, a tablet, a laptop, and/or a computer, among others. In various implementations, the database code repository 412, the report database 424, the rules database 428, the naming standards database 432, the configuration parameters database 436, and the grammar file database 440 or any combination thereof may be included in a single database.

Database Structure

Figure 5:
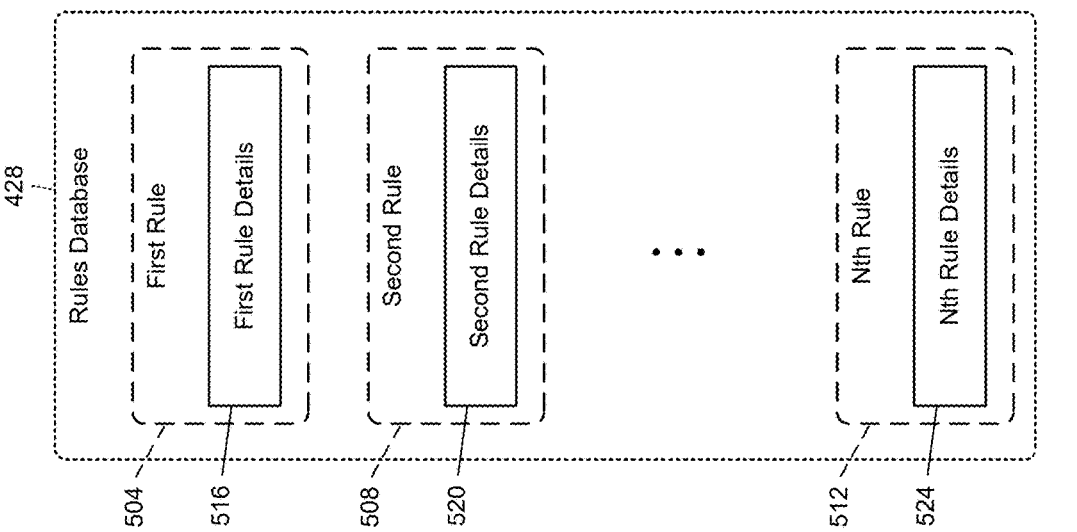
FIG. 5 is an example organization of a rules database according to principles of the present disclosure.

FIG. 5 is an example organization of the rules database 428 according to the principles of the present disclosure. The rules database 428 includes a first rule 504, a second rule

508, . . . , and an Nth rule 512. Each rule includes details about the rule. For example, the first rule 504 includes first rule details 516, the second rule 508 includes second rule details 520, and the Nth rule 512 includes Nth rule details 524. In various implementations, the rule details may be included in a separate rule details database. In such an implementation, the rule details would include an indication indicating the corresponding rule associated with the rule details.

Each of the rule details indicate the rule requirements as well as whether violating the rule results in a warning or an error. As an example, a rule may be that the definition must be populated. The rules details clarify that, to have a definition populated, the definition cannot be null, empty, spaces, or blank. The rule may apply to a variety of attributes within an object of a code file. For example, the definition populated rule may apply to a database definition, a column comment, a column definition, a table comment, a table definition, a subject area definition, etc.

Additional rules for code files may include: ruleset indicator compliant, column comment length less than 256 characters, no bad characters, no double underscores, classword exists, classword abbreviation compliant, unique table names and column names within a table, consistent data types for columns, table names length less than 129 characters, column names less than 129 characters, logical and physical definitions are the same, expected content compliant, primary index for each table compliant, table statistics collection compliant, object location compliant, insert statement compliant, no identity datatypes, DDL script simple plain text compliant, no control characters, column presence and order compliant, no grant commands, datatype matches classword call compliant, no cross joins, in clause items less than 21, no excessive amount of code lines, no inconsistent alias, no excess relational sources, ESP job unique identifier compliant, ESP job unique identifier corresponds to filename compliant, ESP job unique identifier includes exactly 8 characters, valid ESP BUC code, ESP job unique identifier corresponds to target environment, and/or ESP job name length less than 66 characters, among others.

Block Diagram

Figure 6:
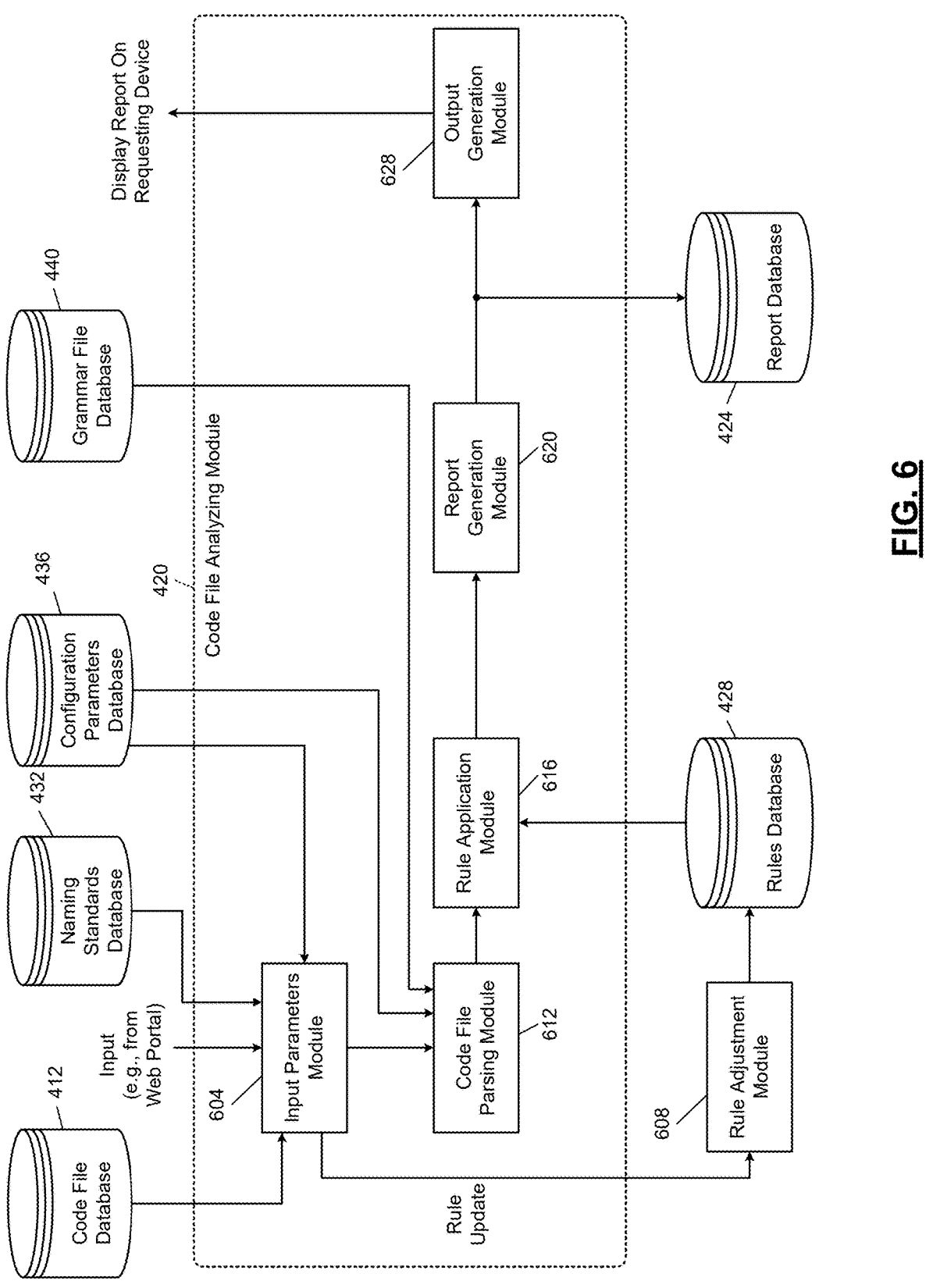
FIG. 6 is a functional block diagram of an example code file analyzing module according to principles of the present disclosure.

FIG. 6 is a functional block diagram of an example code file analyzing module 420 according to principles of the present disclosure. The code file analyzing module 420 receives input from, for example, a web portal via developer devices 404 or manager devices 408. As noted above, the developer devices 404 and the manager devices 408 are generally computing or mobile computing devices, such as a phone, a tablet, a laptop, and/or a computer, among others. The input may include a request for a report for a particular set of code files. The input may instead be directed to adding a rule to the rules database 428, modifying a rule, and/or removing a rule. In various implementations, the input may be automatically received at predetermined intervals indicating a batch of code files. For example, each week a set of completed code files may have a report generated automatically for future review of the last week's code files.

An input parameters module 604 receives the input and determines whether the input indicates a particular set of code files for generating a report or a rule update. If the input indicates a rule update, the input is forwarded to a rule adjustment module 608 to add or remove the rule from the rules database 428. In various implementations, the rule update may change a rule instead of adding to or removing from a rule in the rules database 428. Otherwise, if the input parameters module 604 recognizes the input as a request for a report of a particular set of code files, the input parameters module 604 obtains the particular code files from the database code repository 412.

In various implementations, the input parameters module 604 may be configured to locate and/or obtain the code files to be analyzed from the database code repository 412, determine a code language for each code file, determine whether to read certain code files in parallel, determine how much parallelism to use if the codes files are determined to be read in parallel, determine whether to provide a verbose output, and/or determine whether to load one or generated reports into the report database 424. The input parameters module 604 may be configured to determine names and/or paths to the code files, for example, by using a specified input directory to conduct a recursive and/or descending search of certain subdirectories and/or reading from a list of filenames in a standardized deployment specification, for example, a liquidbase.xml file and/or a master.xml file, among others.

In various implementations, in accordance with the input parameters module 604 obtaining the set of code files, the input parameters module 604 determines the code language of each of the code files. As noted above, a code file may include various forms of structured query language (SQL) code and/or data definition language (DDL) code, among others. For example, a code file may include code written in Teradata, Hive, Oracle, Database 2 (Db2), Postgres, Redshift, Databricks, and/or Snowflake, among others. In some examples, a code file may be associated with an event stream processing (ESP) job schedule and/or Erwin data model extracts, among others. In various implementations, the input parameters module 604 may query the naming standards database 432 and/or the configuration parameters database 436 to determine which naming standards and/or parameters may be applicable to the obtained code files.

In various implementations, a code file parsing module 612 identifies each object within a code file to analyze each object against each rule. For example, the code file parsing module 612 may obtain the appropriate grammar file from the grammar file database 440 for each of the code files and may use the grammar files to parse the code files. For instance, if the input parameters module 604 determines that a particular code file includes Teradata code language, the code file parsing module 612 obtains the grammar file associated with Teradata and uses the grammar file to read and/or process the code file to identify the objects (i.e., tokens).

In various implementations, the code file parsing module 612 may identify key attributes that are common for all the different languages of the code files. The attributes may be used to help facilitate the identification of the objects to check the rules against. The key attributes may be stored in one or more extendable and reusable class structures that are shared in common by the different languages (for example, a base table class). In some examples, class structure data may be accessible via the configuration parameters database 436. In examples where a code file includes one or more language specific attributes (for example, a Redshift distkey attribute), a Redshift base class structure may be extended to store the language specific attributes without changing any data structures used for other languages. In some implementations, the code file parsing module 612 may split a code file into separate commands and parse each command via a grammar file to identify the objects.

In various implementations, the code file parsing module 612 may identify which rules, list of rules, and/or classes of rules to be analyzed against each object and/or code file. In accordance with the input parameters module 604 identifying the code language of each of the code files, the code file parsing module 612 may identify the rules, list of rules, and/or classes of rules that apply to each of the identified code languages. In various implementations, the code file parsing module 612 may identify which rules to be skipped and/or rule exceptions to apply. For example, the code file parsing module 612 may query the configuration parameters database 436 to identify the rules to be skipped and/or the applicable rules exceptions. In various implementations, the code file parsing module 612 may be excluded and the code file analyzing module 420 may run the rules against the entire code file.

The objects and/or the identified rules to be applied may be forwarded to a rule application module 616. The rule application module 616 obtains a plurality of rules from the rules database 428 and runs each rule against each object of the particular code file. The results, whether each rule resulted in a pass, warning, or error, may be forwarded to a report generation module 620. The report generation module 620 is configured to generate various reports. In some examples, a report may identify the number of code files analyzed, the code language of each code file, each rule, and/or whether each rule resulted in a pass, warning, or error. The report may be forwarded to an output generation module 628 to display the report on the requesting device. The report may also be forwarded to the report database 424 for storage. In various implementations, the developer devices 404 and the manager devices 408 can access reports that have already been run by someone else from the report database 424.

In various implementations, the report generation module 620 may be excluded and the results may be forwarded to the output generation module 628. The output generation module 628 is configured to generate various outputs to present the results to the requesting device, the developer devices 404 and/or the manager devices 408. For example, the output generation module 628 may generate one or more error messages in accordance with the results including one or more warnings and/or errors, pass/fail indicator for each code file indicating whether any errors are present, pass/fail exit code that can be used to render judgement of whether a particular code file can be deployed further, a dashboard summary that may show usage and trends, for example, which developer or developer teams have the most errors, and/or one or more messages including explanation for each identified error or warning as to why the error or warning is present, among others. The output generation module 628 may send outputs to various systems for management reporting. For example, the output generation module 628 may send outputs to a Looker dashboard for trend analysis.

In various implementations, in accordance with a code file including an error associated with a particular rule, the user requesting the code file analysis, a developer, and/or a manager may approve the error as a rule exception or rule variation, for example, via input from a web portal. In some examples, rule exceptions or rule variations may be configured for any combination of project name, object name, rule ID, severity, and/or time period, among others. In some instances, a rule may be appropriate for one code file but not another, and users having the ability to approve certain errors as exceptions or variations permits the users to avoid any unnecessary code development delays.

Example Report

FIGS. 7A and 7B are an example report 700 generated by the report generation module 620 according to principles of the present disclosure. The report is an example report that may be stored in the report database 424 or displayed on a requesting device. The report may indicate whether the report includes a verbose output (for example, true), a project name (for example, CCW-D/testing), rule engine type (for example, Teradata_DDL), degree of parallelism (for example, 1), the availability of an applicable grammar file (for example, grammar file is already completed), location(s) and/or filename(s) of the code files analyzed (for example, XML_Filename), number of code files analyzed (for example, 1), number of available rules for the code file (for example, 163), number of rules checked against the code file (for example, 68), number of rule exceptions for the code file (for example, 263), number of SQL statements of the code file (for example, 2), identification of each rule checked against the code file (for example, g001, g002, etc.), results for each rule (for example, good, error, etc.), a results comment for each rule (for example, no UTF-8 errors found in the code file, no syntax errors found in the code file, etc.), identification of all errors (for example, Error-r415: base table should not be multiset, etc.), summary of the errors, location of a summary report of the errors, techdebt used (for example, 0), memory storage used for the generated report (for example, 59.1 Mb), time to generate the report (for example, 2 seconds), among others. In various implementations, the system 400 is configured to analyze a substantial number of code files (for example, 100 or more, 1,000 or more, 10,000 or more, etc,) and generate various reports quickly (for example, 5 seconds or less, 2 seconds or less, 1 second or less, etc.).

Flowcharts

Figure 8A:
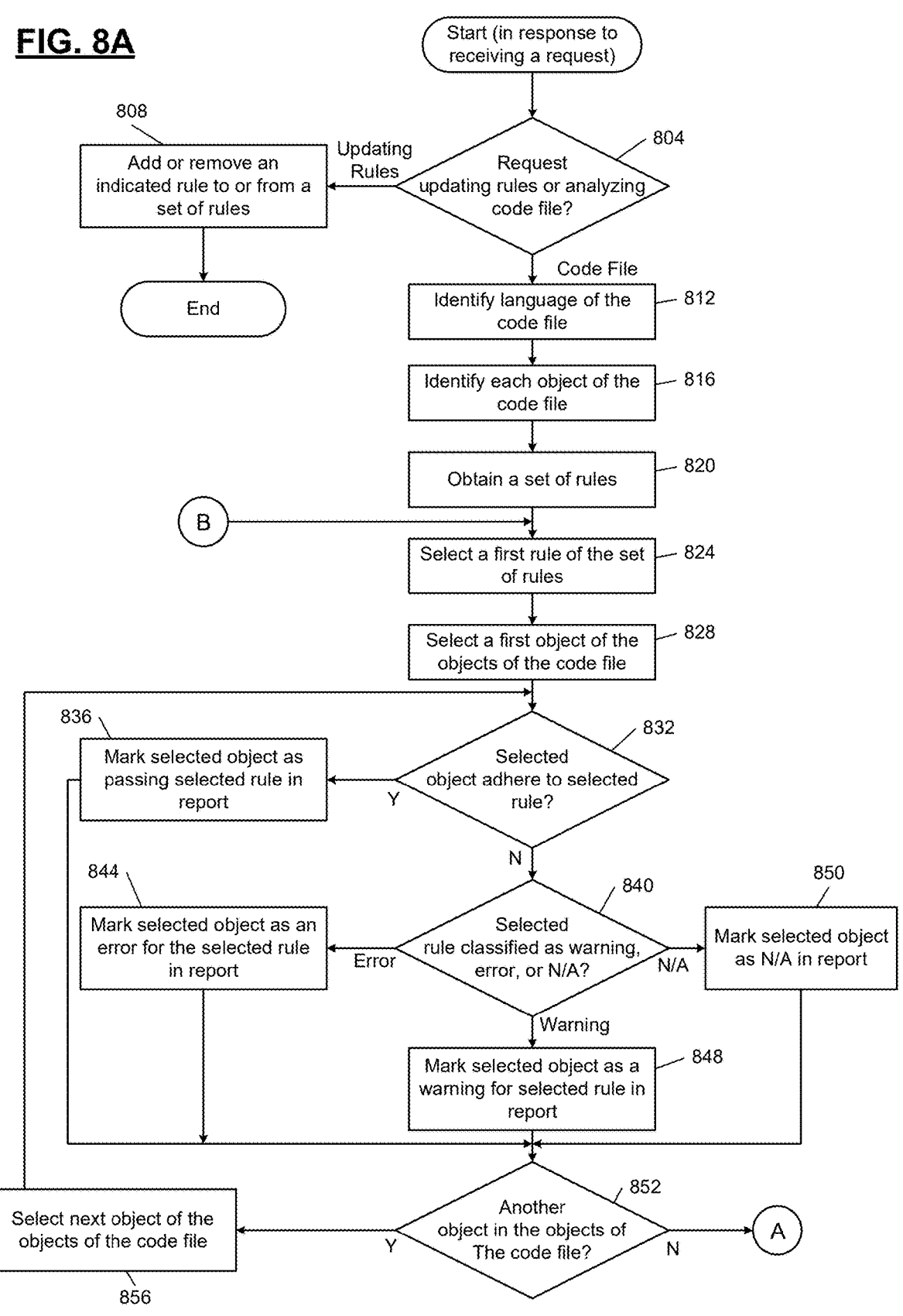
FIGS. 8A-8B are a flowchart depicting an example report generation by a code file analyzing module according to principles of the present disclosure.
Figure 8B:
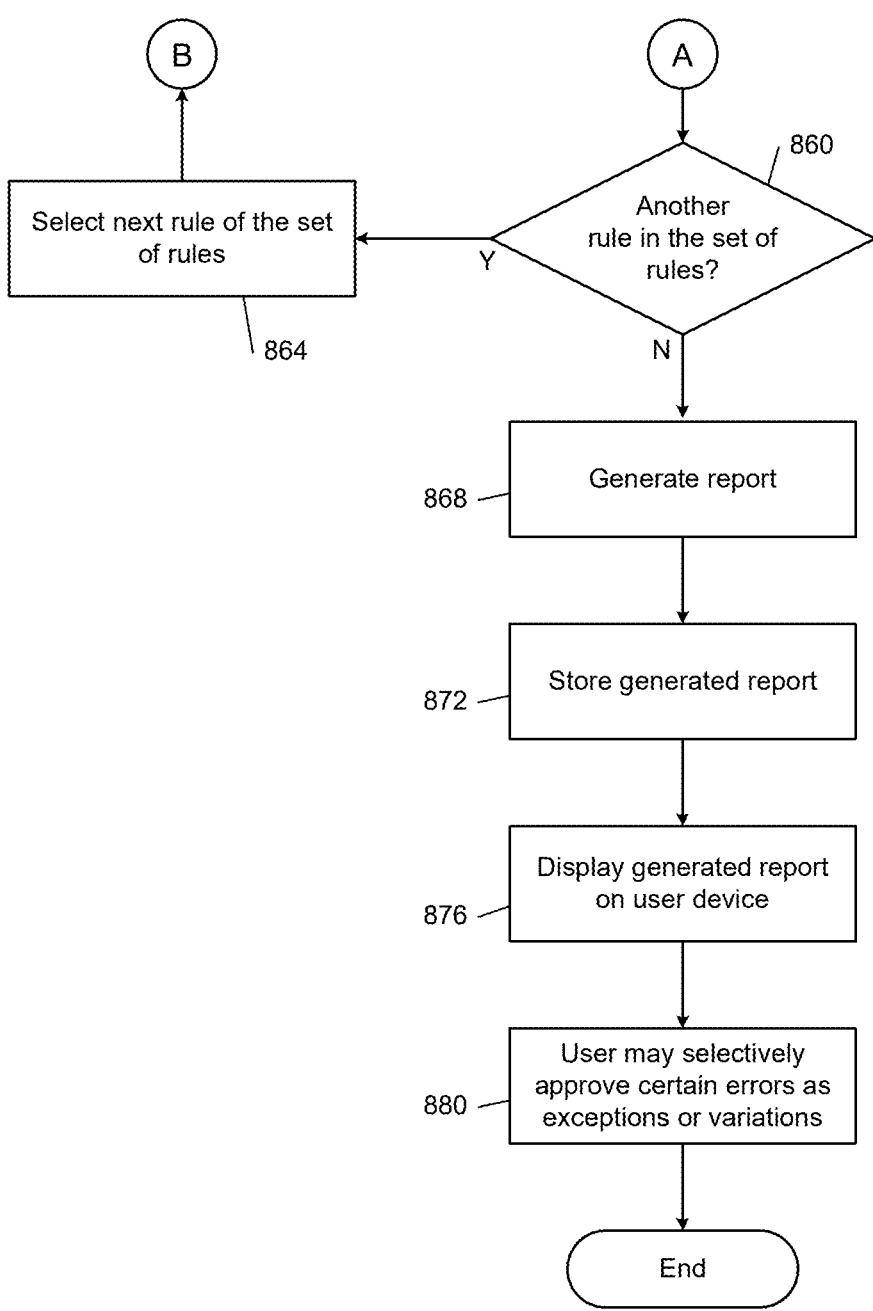

FIGS. 8A-8B together are a flowchart depicting example report generation by a code file analyzing module according to principles of the present disclosure. Control begins in response to receiving a request, such as a report generation request or an add rule request. At 804, control determines whether the request is to update the rules or analyze an indicated code file. If the request indicates updating, such as adding or removing a rule, control proceeds to 808 to add or remove an indicated rule to or from the set of rules. Then, control ends.

Otherwise, if the request indicates a request to analyze a particular code file and generate a report, control proceeds to 812 to identify the code language of the code file. Control continues to 816 to identify each object of the code file. Control continues to 820 to obtain a set of rules, for example, from a rules database. At 824, control selects a first rule of the set of rules. Then, at 828 control selects a first object of the objects of the code file. Control continues to 832 to determine if the selected object adheres to the selected rule. If yes, control continues to 836 to mark the selected object as passing selected rule in the report. Otherwise, if the selected object does not adhere to the selected rule at 832, control continues to 840 to determine if the selected rule is classified as a warning, an error, or N/A.

If the selected rule is classified as an error, control proceeds to 844 to mark the selected object as an error for the selected rule in the report. Otherwise, if the rule is classified as a warning, control continues to 848 to mark the selected object as a warning for the selected rule in the report. In various implementations, at 840 control determines if the selected rule in relevant to the object and, if not, marks the selected object as not applicable or N/A in the report at 850, control continues to 852 to determine if another object is in the objects of the code file. If yes, control proceeds to 856 to select a next object of the objects of the code file. Then, control returns to 832.

Otherwise, if control determines there is not another object in the objects of the code file, control continues to 860 in FIG. 8B. At 860, control determines if another rule is in the set of rules. If yes, control selects a next rule of the set of rules at 864 and returns to 824 in FIG. 8A. In various implementations, the selection of objects versus rules can be switched. The flowcharts of FIGS. 8A and 8B are intended to depict that each rule is run against each object. If control determines at 860 that there is not another rule in the set of rules, control continues to 868 to generate a report. At 872, control stores the generated report in a report database. At 876, control displays the generated report on the requesting user device. At 880, a user (for example, the user of the requesting user device) may selectively approve certain identified errors as error exceptions or variations. In various implementations, if an error is identified as an error exception or variation, then that error will not prohibit the code file from functioning properly. Then, control ends.

Figure 9:
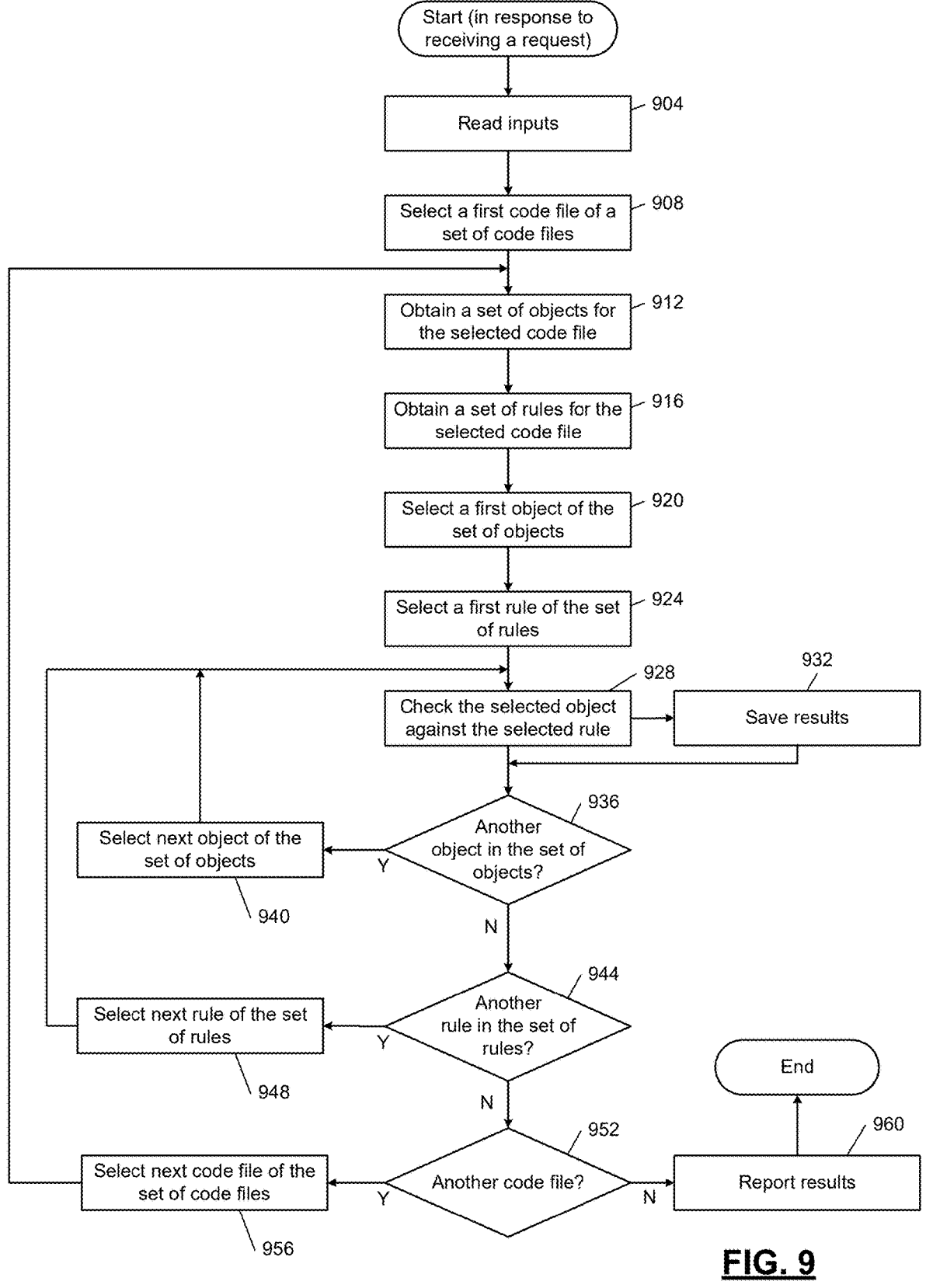
FIG. 9 is a flowchart depicting an example report generation by a code file analyzing module according to principles of the present disclosure.

FIG. 9 is a flowchart depicting example report generation by a code file analyzing module according to principles of the present disclosure. Control begins in response to receiving a request such as a report generation request. At 904, control reads all inputs, for example, a set of code files to be analyzed and/or configuration parameters of the code files, among others. Control continues to 908 to select a first code file of the set of code files to be analyzed. Control continues to 912 to obtain a set of objects for the selected code file. Control continues to 916 to obtain a set of rules, for example, from a rules database. At 920, control selects a first object of the set of objects. At 924, control selects a first rule of the set of rules. Control continues to 928 to determine if the selected object adheres to the selected rule. At 932, control saves the results, for example, to a report database.

Control continues to 936 to determine if another object is in the set of objects. If yes, control selects a next object of the set of objects at 940 and returns to 928. If control determines at 936 that there is not another object in the set of objects, control continues to 944. At 944, control determines if another rule is in the set of rules. If yes, control selects a next rule of the set of rules at 948 and returns to 928. If control determines at 944 that there is not another rule in the set of rules, control continues to 952. At 952, control determines if another code is in the set of code files. If yes, control selects a next code file in the set of code files at 956 and returns to 912. Otherwise, control reports the results to a user at 960. Then, control ends.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code coupled with memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized (or computer-implemented) apparatuses and methods. The functional blocks and flow-chart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
processor hardware; and
memory hardware coupled to the processor hardware, wherein the memory hardware stores:
a database code repository including a plurality of code files, wherein the plurality of code files includes 100 or more code files;
a rules database including a plurality of rules; and
instructions for execution by the processor hardware, and
wherein the instructions include, in response to receiving an input indicating a selected code file from a user device of a user:
obtaining the selected code file from the database code repository;
identifying a code language of the selected code file; and
analyzing a plurality of selected code files in parallel by:
identifying a plurality of objects within the plurality of selected code files, wherein the plurality of selected code files includes the selected code file;
obtaining a set of rules from the rules database;
for each rule of the set of rules, applying the rule to each object of the plurality of objects to determine an adherence of the object to the rule or a violation of the object of the rule;
generating at least one report that indicates, for each rule of the set of rules and for each object of the plurality of objects, the adherence of the object to the rule or the violation of the object of the rule, a location of each code file of the plurality of selected code files, a number of rules available for the plurality of selected code files, and a number of rules checked against the plurality of selected code files; and
transmitting, for display on the user device, the generated at least one report, wherein the system is configured to analyze and generate reports for the plurality of selected code files in 5 seconds or less.

2. The system of claim 1, wherein the selected code file includes code in a structured format.

3. The system of claim 1, wherein the selected code file includes at least one of structured query language (SQL) code and data definition language (DDL) code.

4. The system of claim 1, wherein the selected code file is associated with at least one of event stream processing (ESP) and data model extracts.

5. The system of claim 1, wherein identifying the plurality of objects within the plurality of selected code files includes:
obtaining a grammar file from a grammar file database, wherein the grammar file is associated with the identified code language of the selected code file; and
processing the grammar file in conjunction with the plurality of selected code files to identify the plurality of objects, wherein the report indicates an availability of the grammar file.

6. The system of claim 1, wherein the memory hardware stores identification of a set of rules to skip and a set of rule exceptions for the selected code file.

7. The system of claim 1, wherein:
the memory hardware stores a report database; and
the instructions include storing the generated at least one report in the report database.

8. The system of claim 7, wherein the instructions include, in response to receiving a report request from the user device:
obtaining a first report indicated in the report request from the report database; and
transmitting, for display on the user device, the first report.

9. The system of claim 1, wherein the rules database stores, for each rule of the set of rules, an indication that violation of the rule generates at least one of a warning and an error.

10. The system of claim 1, wherein the instructions include:
in response to receiving a rule add request, adding a rule specified by the rule add request to the rules database; and
in response to receiving a rule delete request, removing a rule specified by the rule delete request from the database.

11. A computer-implemented method comprising:
storing a plurality of code files in a database code repository, wherein the plurality of code files includes 100 or more code files; and
in response to receiving an input indicating a selected code file from a user device of a user:
obtaining the selected code file from the database code repository;

identifying a code language of the selected code file; and analyzing a plurality of selected code files in parallel by:

identifying a plurality of objects within the plurality of selected code files, wherein the plurality of selected code files includes the selected code file;

obtaining a set of rules from a rules database;

for each rule of the set of rules, applying the rule to each object of the plurality of objects to determine an adherence of the object to the rule or a violation of the object of the rule;

generating at least one report that indicates, for each rule of the set of rules and for each object of the plurality of objects, the adherence of the object to the rule or the violation of the object of the rule, a location of each code file of the plurality of selected code files, a number of rules available for the plurality of selected code files, and a number of rules checked against the plurality of selected code files; and transmitting, for display on the user device, the generated at least one report, wherein the plurality of selected code files are analyzed and corresponding reports are generated in 5 seconds or less.

12. The computer-implemented method of claim 11, wherein the selected code file includes code in a structured format.

13. The computer-implemented method of claim 11, wherein the selected code file includes at least one of structured query language (SQL) code and data definition language (DDL) code.

14. The computer-implemented method of claim 11, wherein the selected code file is associated with at least one of event stream processing (ESP) and data model extracts.

15. The computer-implemented method of claim 11, wherein identifying the plurality of objects within the plurality of selected code files includes:

obtaining a grammar file from a grammar file database, wherein the grammar file is associated with the identified code language of the selected code file; and processing the grammar file in conjunction with the plurality of selected code files to identify the plurality of objects.

16. The computer-implemented method of claim 11, further comprising identifying at least one of a subset of the set of rules to skip and a set of rule exceptions for the selected code file.

17. The computer-implemented method of claim 11, further comprising storing the generated at least one report in a report database.

18. The computer-implemented method of claim 17, further comprising, in response to receiving a report request from the user device:

obtaining a first report indicated in the report request from the report database; and transmitting, for display on the user device, the first report.

19. The computer-implemented method of claim 11, further comprising storing in the rules database, for each rule of the set of rules, an indication that violation of the rule generates at least one of a warning and an error.

20. The computer-implemented method of claim 11, further comprising:

in response to receiving a rule add request, adding a rule specified by the rule add request to the rules database; and in response to receiving a rule delete request, removing a rule specified by the rule delete request from the database.

* * * * *